(12) United States Patent
Needham et al.

(10) Patent No.: US 12,111,332 B2
(45) Date of Patent: Oct. 8, 2024

(54) SYSTEM AND METHODS FOR SENSING ENVIRONMENTAL CONDITIONS SURROUNDING PHOTOVOLTAIC SYSTEMS

(71) Applicant: AVSensor, LLC, Mont Vernon, NH (US)

(72) Inventors: Christopher Thomas Needham, Mountain View, HI (US); Frank Carl Oudheusden, Mont Vernon, NH (US)

(73) Assignee: AVSENSOR, LLC, Mont Vernon, NH (US)

(*) Notice: Subject to any disclaimer, the term of this patent is extended or adjusted under 35 U.S.C. 154(b) by 9 days.

(21) Appl. No.: 17/651,418

(22) Filed: Feb. 16, 2022

(65) Prior Publication Data
US 2022/0268801 A1 Aug. 25, 2022

Related U.S. Application Data

(60) Provisional application No. 63/151,208, filed on Feb. 19, 2021.

(51) Int. Cl.
*G01P 1/07* (2006.01)
*G01W 1/04* (2006.01)
*H02S 50/00* (2014.01)
*H04W 84/18* (2009.01)

(52) U.S. Cl.
CPC ............ *G01P 1/07* (2013.01); *G01W 1/04* (2013.01); *H02S 50/00* (2013.01); *H04W 84/18* (2013.01)

(58) Field of Classification Search
None
See application file for complete search history.

(56) References Cited

U.S. PATENT DOCUMENTS

| 8,289,183 | B1* | 10/2012 | Foss | H04Q 9/00 |
| | | | | 361/91.1 |
| 2010/0241375 | A1* | 9/2010 | Kumar | H02S 40/38 |
| | | | | 702/62 |
| 2010/0275968 | A1* | 11/2010 | Kaiser | H01L 31/02021 |
| | | | | 136/244 |
| 2011/0132424 | A1* | 6/2011 | Rakib | H02J 3/381 |
| | | | | 136/244 |
| 2011/0297141 | A1* | 12/2011 | Correia | F24S 50/00 |
| | | | | 126/601 |
| 2017/0179872 | A1* | 6/2017 | Almy | H02S 20/32 |
| 2018/0212558 | A1* | 7/2018 | Meller | G05D 1/0225 |
| 2019/0012466 | A1* | 1/2019 | Ricotta | H04L 63/102 |
| 2019/0393828 | A1* | 12/2019 | Huuhtanen | H02S 50/00 |

* cited by examiner

*Primary Examiner* — Michael J Dalbo
*Assistant Examiner* — Denise R Karavias
(74) *Attorney, Agent, or Firm* — PERKINS COIE LLP; Colin Fowler (57) ABSTRACT

Movement of photovoltaic panels is measured using an array of low-cost devices. Accelerometers are mounted on photovoltaic panels across a site to measure wind speed and direction. Time stamped data from the devices is transmitted to a central computing device which calculates a rolling, lagging wind speed and direction. Measured movement of the photovoltaic panels is used to determine when to place photovoltaic panels in a protective stow mode to reduce damage during a wind event.

14 Claims, 11 Drawing Sheets

SYSTEM AND METHODS FOR SENSING ENVIRONMENTAL CONDITIONS SURROUNDING PHOTOVOLTAIC SYSTEMS

TECHNICAL FIELD

This disclosure relates generally to photovoltaic systems, and in particular to monitoring of environmental conditions around a photovoltaic system.

BACKGROUND

Photovoltaic (PV) systems are affected by their environmental surroundings. The environmental conditions, such as wind, around a PV system can cause the system to fail. PV system developers currently employ sensors to manage the operation of a solar power plant. Typically, these sensors are expensive and may interfere with the operation of PV panels due to shading or clearance requirements. To limit negative effects, a large PV power plant project may use only a few of each type of sensor to monitor the site.

Utilizing a small number of sampling devices to monitor a PV power plant can lead to multiple issues. For example, snow drifting may lead to an inaccurate reading of peak snow accumulation. A more critical issue is a low number of sample locations for wind measurements for solar power plants in general and tracking structures specifically. The current solar tracker design methods frequently involve putting the array into a wind stow configuration above a certain wind speed. A low number of sample locations introduces multiple failure modes to PV plant design including, but not limited to: incorrect wind modeling or analysis, local wind speeds being higher or lower than at anemometer locations, topographical effects incorrectly increasing or reducing the anemometer wind speeds recorded, faulty anemometer equipment, and power losses. The end result of PV plant failures is evident within the industry with the increasingly common aeroelastic failures observed on PV systems. These failures are often catastrophic and have resulted in a complete loss of PV systems.

DETAILED DESCRIPTION

An array of low cost accelerometers and other sensors for detecting PV panel movement. The accelerometers detect the peak magnitude with a timestamp of the PV panel as it moves, instead of indirectly correlating PV panel movement to wind speed and direction using an anemometer and wind tunnel testing. In particular, the array of accelerometers measures movement induced by a wind event. The data from the accelerometers is processed to determine the amount of movement of the PV panels across the system. A computing system with pre-programmed conditions determines whether the PV panels should be placed in a wind stow position to decrease the likelihood of damage from the wind event.

Photovoltaic (PV) power systems frequently track the sun to various degrees to increase an amount of energy produced by the system. These trackers typically move photovoltaic modules to adjust an angle of incidence of the sunlight on the surface of the PV modules. In particular, trackers typically rotate the PV modules around an axis principally oriented north to south, tilting the modules to as much as 60 degrees towards the east and west and adjusting tilt within this range throughout the day. By tracking the position of the sun, PV power systems often produce 20-30% more energy than fixed-tilt systems.

A common configuration of horizontal single-axis trackers ("SAT") as described above includes a single actuator near the center of a row of PV modules, potentially with 80-120 modules tilted by a single actuator. The angle of tilt is defined by the position of the actuator, while a torque tube or other similar device transfers moments and positions the rest of the row at the tilt of the actuator. However, environmental loading (wind, snow, dead load, etc.) can twist portions of a row away from the intended tilt angle. These types of solar trackers are referred to as "flexible" within the industry in comparison to types that use an actuator on sufficient points along a solar tracker row to constrain maximum twist to less than 10 degrees delta measured along a given row. Solar trackers that exhibit meaningful twisting under wind loading require that both static and dynamic impacts be considered through wind tunnel testing. The combination of static and dynamic wind loading results in a total system wind loading. The twisting is typical of other types of flexible structures that deform under wind loading and is well studied in the industry through aeroelastic wind tunnel testing and related simulation modeling.

Flexible PV systems generally rely on as few actuators as possible (actuators are comparatively expensive parts). The ratio of actuators to panels is higher than in non-flexible systems. Non-flexible systems use more actuators in place of damping; however, the additional actuators increase the overall cost of the system.

For purposes of this disclosure a "flexible" solar tracker system is one subject to sufficient deflection as to require aeroelastic consideration. 10 degrees of absolute twist is a typical cut-off for when a static wind tunnel test report may be used without specific aeroelastic testing added in. However, the selection of 10 degrees of absolute twist is subjective on the part of the wind tunnel test facilities and allows for a buffer between when aeroelastic effects begin to dominate. Flexible tracker systems allow for deflection requiring aeroelastic consideration due to a relative lack of points of fixity along each row. Actuators generally act as points of fixity. Rows that have few (or a single) actuator or other point of fixity per panel/module are flexible.

PV systems experience catastrophic failures due to wind events. These failures cause portions of the PV system to be destroyed by deforming the PV panels and/or the support structure. In an increasing number of cases PV systems are failing under moderate wind conditions that are less than the design wind load. These PV systems are typically failing due to aeroelastic responses from wind exposure. The failure typically arises from rotational oscillation about the rotation axis of the PV panel.

Wind conditions at PV projects are currently monitored by anemometers. Anemometers have several drawbacks. First, anemometers monitor wind speed not motion of the PV panels directly. This means that according to current practices, the amount of movement experienced by the PV panels is correlated to the wind speed using wind tunnel pluck tests and modeling of aeroelastic behavior. The models are often incorrect or too simple of a representation of on-site conditions during a wind event. Lack of understanding about real loads experienced by PV panels leads to design errors.

Second, anemometers are expensive to install and maintain. The cost of an anemometer can be too great for smaller projects, these smaller projects are constructed without sufficient numbers of anemometers and there is no way to fully detect wind conditions and protect the PV system from wind damage. Third, the anemometers can shade the PV panels and thus decrease the amount of sunlight collected. The expense and shading issues for an anemometer lead to solar projects only placing one or a small number per site. Due to the small number of anemometers the amount of data that can be collected is very limited. The limited amount of data leads to the PV panels either moving to a stow position too early or too late. If the PV panels are stowed too late the PV panels can be unnecessarily damaged. If the PV panels are stowed too early the PV panels do not collect the maximum amount of energy possible. Additionally, wind failures are highly dependent on the wind approach direction, and an array of accelerometers gives more granular information on wind approach direction.

Movements in the PV panels can be measured directly by mounting an accelerometer on the PV panel. The accelerometer detects PV panel movement on the x-axis, y-axis, and z-axis as well as rotations about each axis. The data from the accelerometer is collected and used to determine how much movement the PV panel actually exhibits from wind forces. This is done by creating a rolling timestamp on peak measured movement for each device and using the accelerometers known locations to calculate wind velocity instead of simply measuring wind speed at several locations as is done with anemometers today. Accelerometer data is used to move the PV panel into a stowed position or after a wind event to determine how the wind forces affected the PV panel. The accelerometer data is more reliable than anemometer data because there are many more sample points and the data is more distributed across the site to form an array of accelerometers due to the lower cost of installing accelerometers. An array of accelerometers produces higher fidelity sampling.

Figure 1:
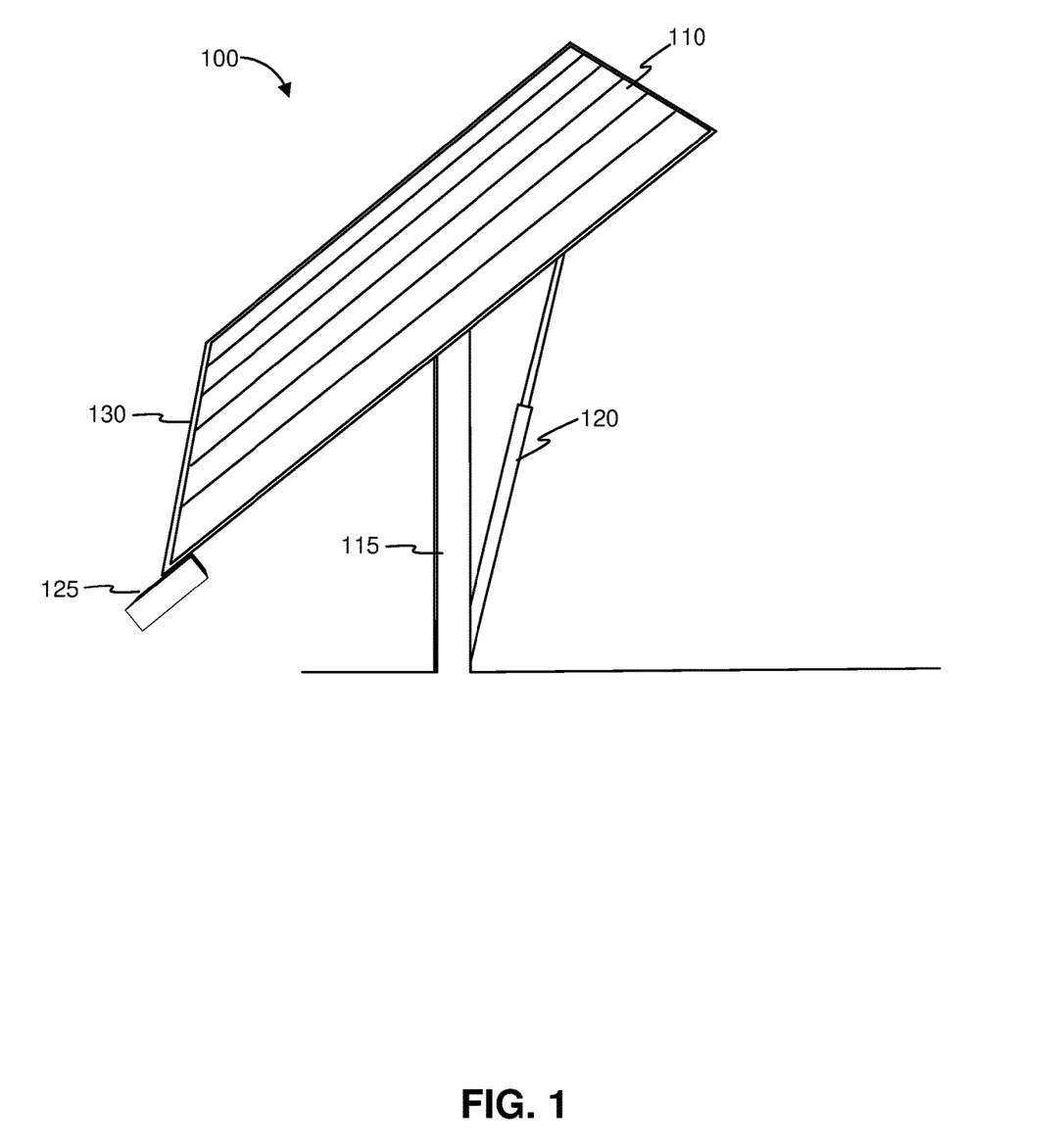
FIG. 1 illustrates a PV module with a sensor attached.

FIG. 1 illustrates one embodiment 100 of an accelerometer sensor 125 mounted on a PV panel 110. The PV panel 110 is supported by a base 115. The angle of tilt of the PV panel 110 is adjusted by an actuator 120 that is coupled to the base 115 and the PV panel 110. The accelerometer sensor 125 is mounted on an edge 130 of the PV panel 110. The accelerometer sensor 125 is mounted on the edge 130 so that an additional small PV panel that is part of the accelerometer sensor and powers the accelerometer sensor 125 is exposed to the sunlight. Mounting the accelerometer sensor 125 on the edge 130 is also advantageous because the PV panel 110 experiences greater movement at points farther from the base 115. Thus, the accelerometer sensor 125 can read maximum movement of the PV panel 110 and reduce the rate of error in the collected data.

Figure 2:
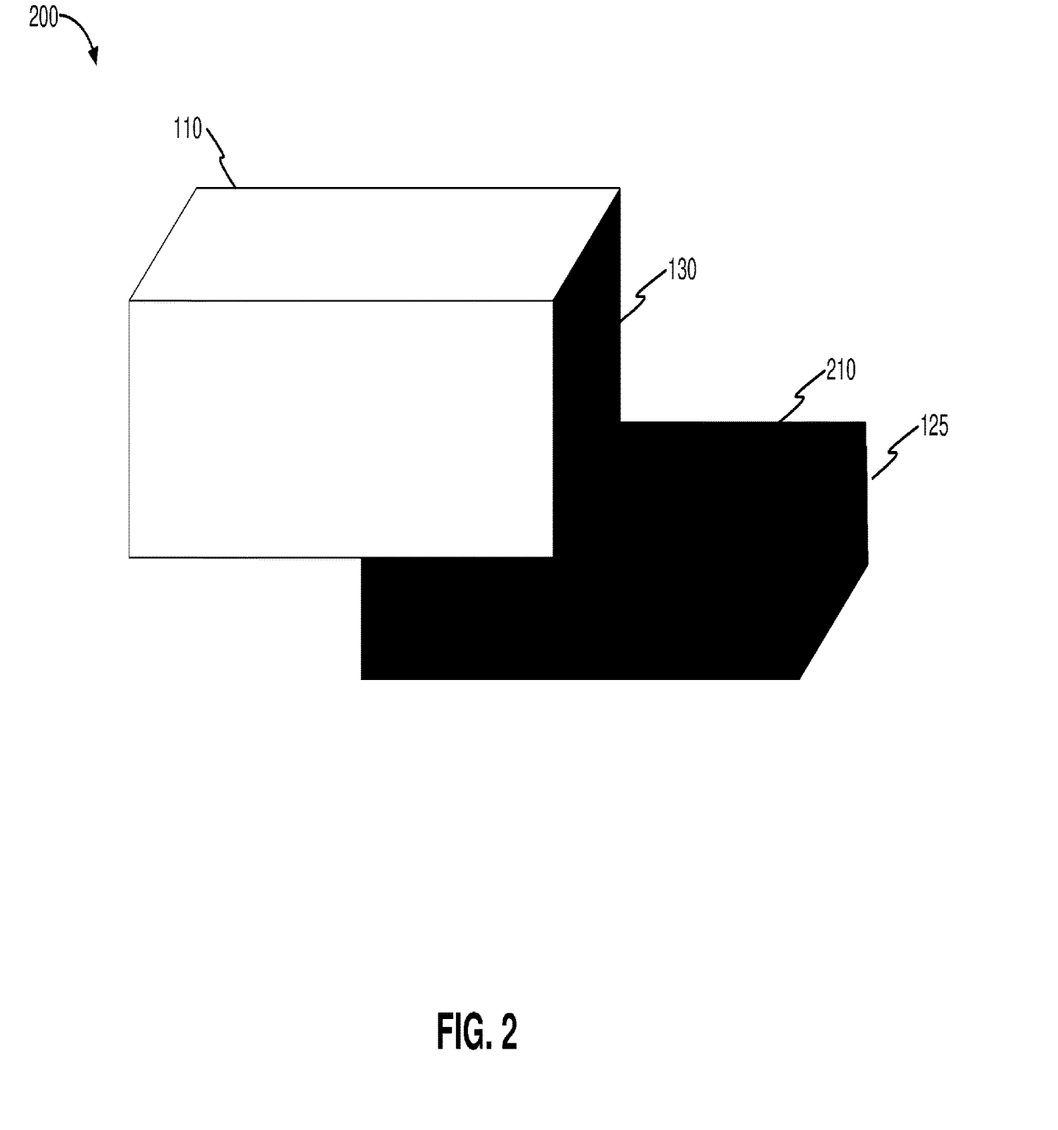
FIG. 2 is a detail view of a sensor on a PV panel.

FIG. 2 illustrates an orthogonal view 200 of the accelerometer sensor 125 on the PV panel 110. The accelerometer sensor 125 is installed on the bottom of the PV panel 110, so that the accelerometer sensor 125 does not shade the PV panel 110. A portion of the accelerometer sensor 125 extends beyond the edge 130 of the PV panel 110. A small sensor PV panel 210 is mounted on the upper side of the sensor 125. The sensor PV panel 210 is oriented in the same direction as the PV panel 110, so that the sensor PV panel 210 collects sunlight at the same time as the PV panel 110. The sensor PV panel 210 powers the accelerometer sensor 125. The sensor PV panel 210 collects energy independently of the PV panel 110 itself. Using an independent sensor PV panel 210 allows the accelerometer sensor 125 to operate independently of the PV panel 210 power system.

The accelerometer sensor 125 consists of at least an accelerometer. The accelerometer directly measures PV panel 110 movement. Since accelerometers are relatively inexpensive many more accelerometers are used across a PV power plant site. Accelerometer data across the site can be used to determine wind speed and duration of gusts. The collected data is time stamped. By correlating data from a number of accelerometers, the direction of the wind, the speed of the wind and the duration of gusts can be determined across the site. Additionally, the data can be used to determine which panels are experiencing the most movement from the wind and to predict which panels are most likely to experience larger wind loads. Accelerometer sensors 125 may also include a wi-fi repeater and a battery. The wi-fi repeater creating a mesh network on the site with other accelerometer sensors 125 with wi-fi repeaters. The battery is capable of being charged by the sensor PV panel and providing power to the accelerometer and wi-fi repeater during night time and low light conditions. The accelerometer sensor includes a power module. The power module providing maximum power point tracking, battery charging/discharging and regulated power supply for an IOT platform.

Figure 3:
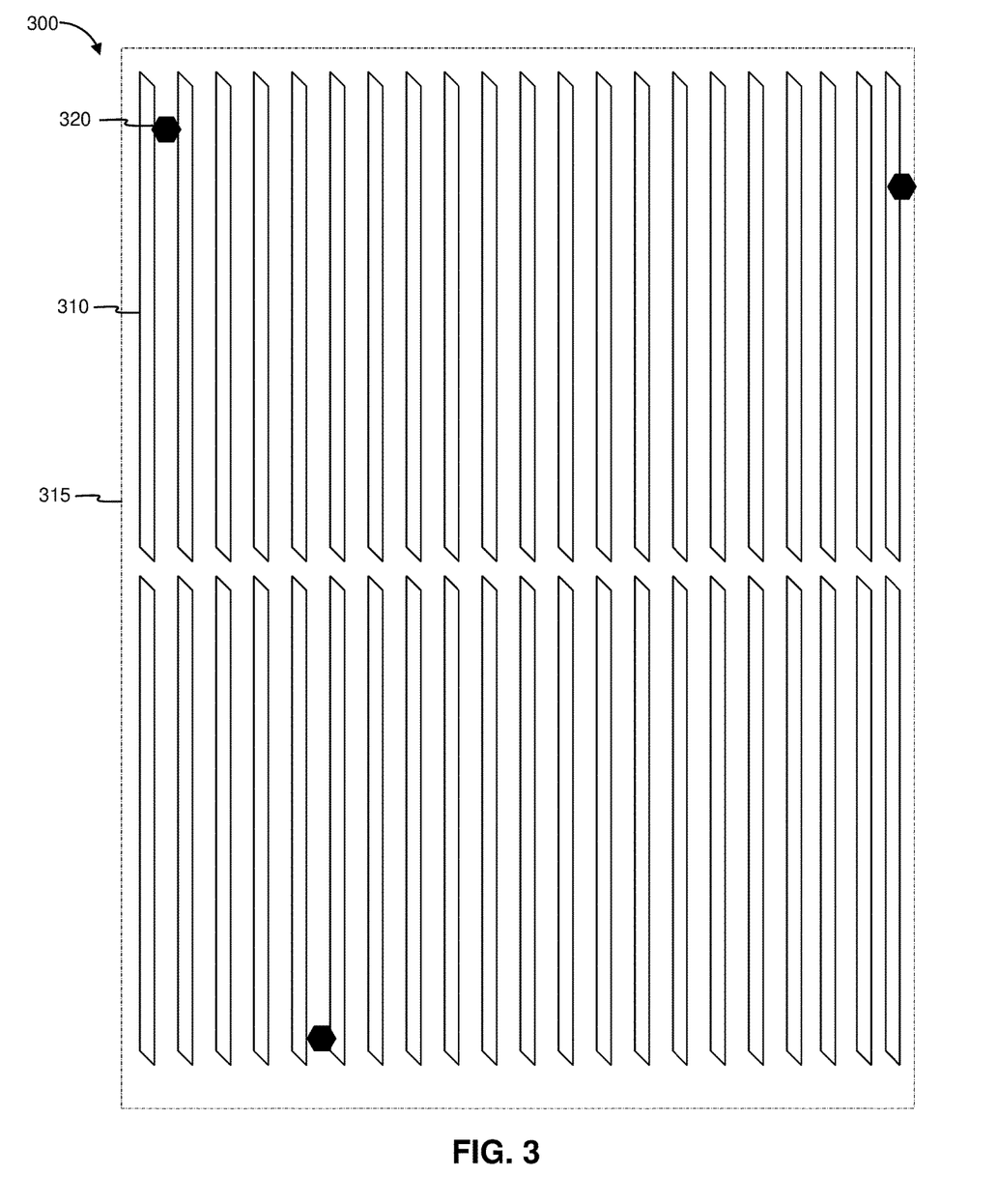
FIG. 3 illustrates a PV power project site with anemometers.

FIG. 3 illustrates an example of placement of anemometers 320 on the PV power plant site 300. Here three anemometers 320 are shown along the edges of the PV power plant site 300. The anemometers 320 are distributed among the PV systems 310 in the array. The PV power plant site 300 is bounded by a property boundary 315. Only three anemometers 320 are possible on a large site due to their expense and other limiting factors.

Figure 4:
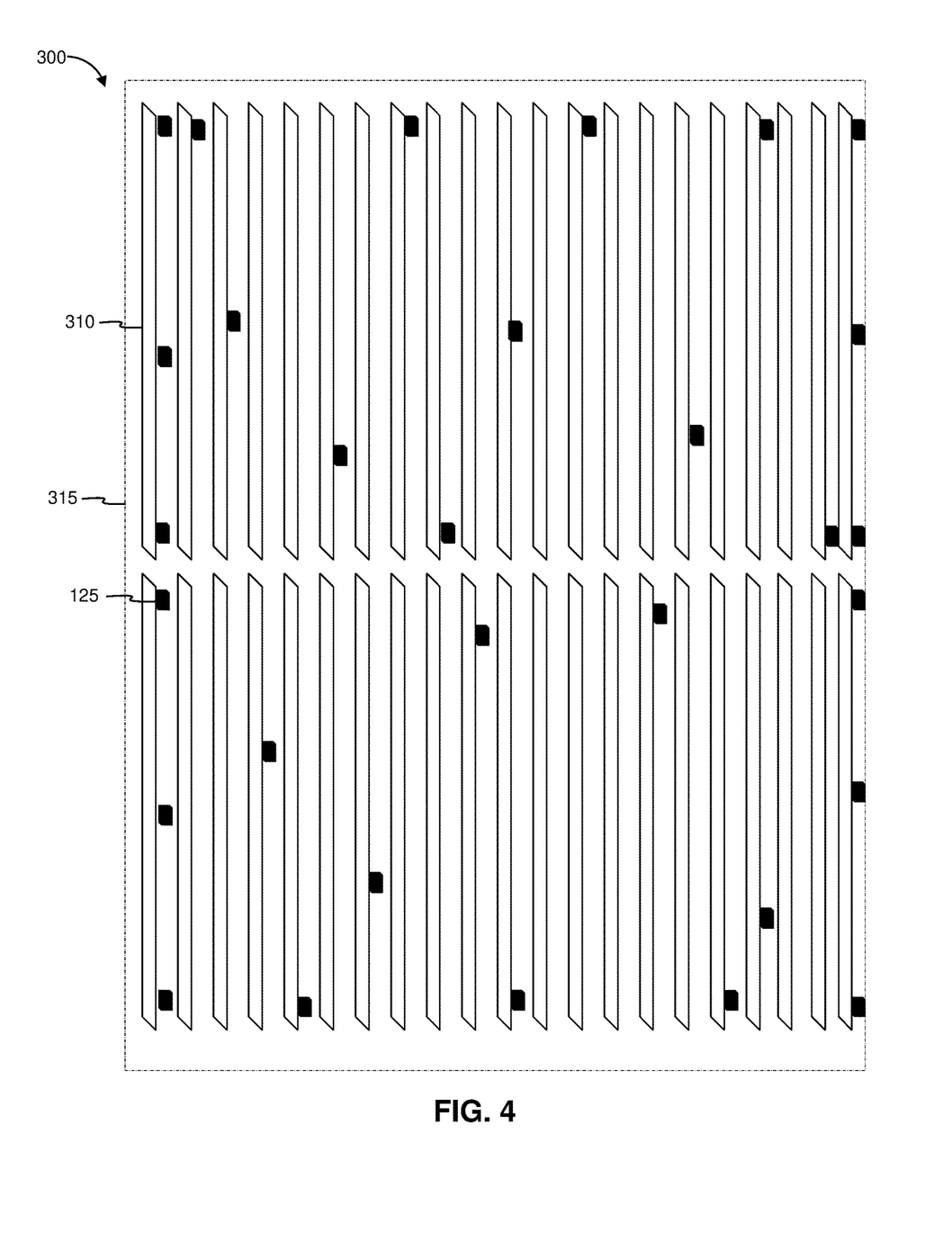
FIG. 4 illustrates a PV power project site with sensors.

FIG. 4 illustrates example placement of accelerometer sensors 125 on the same PV power plant site 300. The accelerometer sensors 125 are distributed across the PV power plant site 300. The number of accelerometer sensors 125 is significantly greater than the number of anemometers 320 in FIG. 3. The accelerometer sensors 125 are distributed so that additional accelerometer sensors 125 are located towards the edges of the PV power plant site 300 and fewer are placed in the middle. The placement targets the portions of the PV array that are likely to aerolastically deflect the most. The edges of a flexible system are the furthest away from a point of fixity (e.g., the actuator) which is typically in the center of each row.

This does not preclude evenly distributing the accelerometer sensors 125 across the PV power plant site 300. PV panels 310 on the edges of the PV power plant site 300 are more likely to experience higher wind loads so additional accelerometer sensors 125 at the edges of the PV power plant site 300 can collect data at critical locations. PV panels 310 in the center of the row are comparatively fixed based on linkage to a point of fixity (e.g., the actuator). Further, PV panels 310 in the middle of the site are shielded by the PV panels 310 on the edge of the PV power plant site 300, if the PV power plant site 300 is relatively flat.

While accelerometer sensors 125 positioned in relatively shielded areas should be have lower acceleration vectors, the expected difference can be used as a further point for wind analysis. That is, where the difference between the accelerometers near points of fixity and near row edges differ greatly, the controller is enabled to conclude that the environmental conditions are dangerous to continued operation.

Site topography may be such that different portions of the PV power plant site 300 are more likely to experience higher wind loads than others. For example, the center of the PV power plant site 300 may be at the top of a hill and the edges of the PV power plant site 300 may be located down in a valley. The area at the top of the hill would be less protected by the surrounding topography so it may experience greater wind loads. An increased number of accelerometer sensors 125 may be placed at the top of the hill to more accurately measure the wind load. Fewer accelerometer sensors 125 may be placed at the lower elevations because the wind load may be less intense at the lower elevation.

Accelerometer sensors 125 can be placed at many locations across the PV power plant site 300 no matter the expected wind loading at each location because the PV panels 110 may move into a stowed position at different times depending on the wind loading experienced at that particular location.

Saturation of accelerometer sensors 125 varies from power plant site 300 to site 300. Once a predetermined density threshold of accelerometer sensors 125 is met, there is diminishing returns on the addition of additional sensors 125. In this case, sensor density takes into account sensors per row, as well as sensors per row edge, sensors per row center, sensors per site edge, and sensors per site center.

An upper tolerance for movement in the PV panels 110 can be preset. Then when a specific panel reaches the upper limit of acceptable movement the PV panel 110 is moved into a stow position to reduce damage to the PV panel 110. The stow position is a safer position for the PV panel 110 that reduces damage to the PV panel 110. Additionally, an upper tolerance for measured vibratory motion in the PV panel 110 can be preset. One end state of this motion can be flutter, when the PV panel 110 moves in a cyclical manner due to wind loading. The flutter can be caused by an improper operating state of the PV system. Flutter can be a precursor to PV panel 110 failure. If the accelerometer sensor 125 detects PV panel movement at or above the upper tolerance for flutter onset conditions, then the PV panel 110 is moved into a stow position to reduce damage to the PV panel 110.

PV panels also fail from buffeting and from not entering a wind stow configuration early enough. Buffeting is a vibratory failure mode that is typically caused by shed vortices/turbulence within a PV array. Buffeting is generally a vibration in-plane with the panels than an oscillation about the center of rotation. Failure due to not entering a wind stow configuration early enough is generally caused by simple static wind loading. The PV system is designed to enter the wind stow configuration prior to experiencing design wind loads, if the PV system does not enter the protected wind stow configuration it can fail.

PV panels 110 can be moved to a stow position with more accuracy and granularity because of the number of accelerometer sensors 125. As an accelerometer sensor 125 detects movement that indicates that the PV panel 110 will be damaged then the PV panels 110 in the immediate vicinity of the accelerometer sensor 125 are stowed. If other accelerometer sensors 125 are not observing such large movement magnitudes then the PV panels 110 in the vicinity of those accelerometer sensors 125 can be left in the operating position and continue to collect the maximum amount of sunlight. The additional data and ability to measure movement of many different PV panels 110 allows the system to stow with greater accuracy. The system can stow vulnerable tracker units and leave more shielded tracker units in position thus increasing their operating time.

Another benefit of directly measuring the movement of the PV panel 110 is that more is understood about the conditions around the PV panel 110 before failure. Data from accelerometer sensors 125 and other sensors is recorded as it is collected and then referenced after the failure. This data could show whether or not there was unintentional movement of the PV panel 110, if the PV panel 110 was responding in a manner not consistent with its design, if there were high gusting winds, snow drifts or other unusual conditions prior to failure.

In addition to an accelerometer, the site may include additional sensors to observe environmental conditions surrounding the PV system and to improve PV system performance. Additional sensors may include but are not limited to a snow detection sensor such as an ultrasonic or laser sensor. Snow detection sensors reduce the risk of trackers moving into an unknown snow bank, the snow bank reducing sunlight collection or damaging the tracker. The snow bank having been created by a snow drift on the site. A stress/strain sensor for determining the structural load induced on the structural members. On site security cameras providing remote visual access to the site for monitoring the site from one or more points of view. An irradiance sensor for measuring the rate at which solar energy falls onto a surface. A soiling measurement sensor for measuring the soiling effects on the PV panels and determining the amount of soiling versus a determined non-soiled baseline. A humidity sensor for measuring the humidity in the ambient air. A temperature sensor or thermometer for measuring the ambient air temperature.

Figure 5:
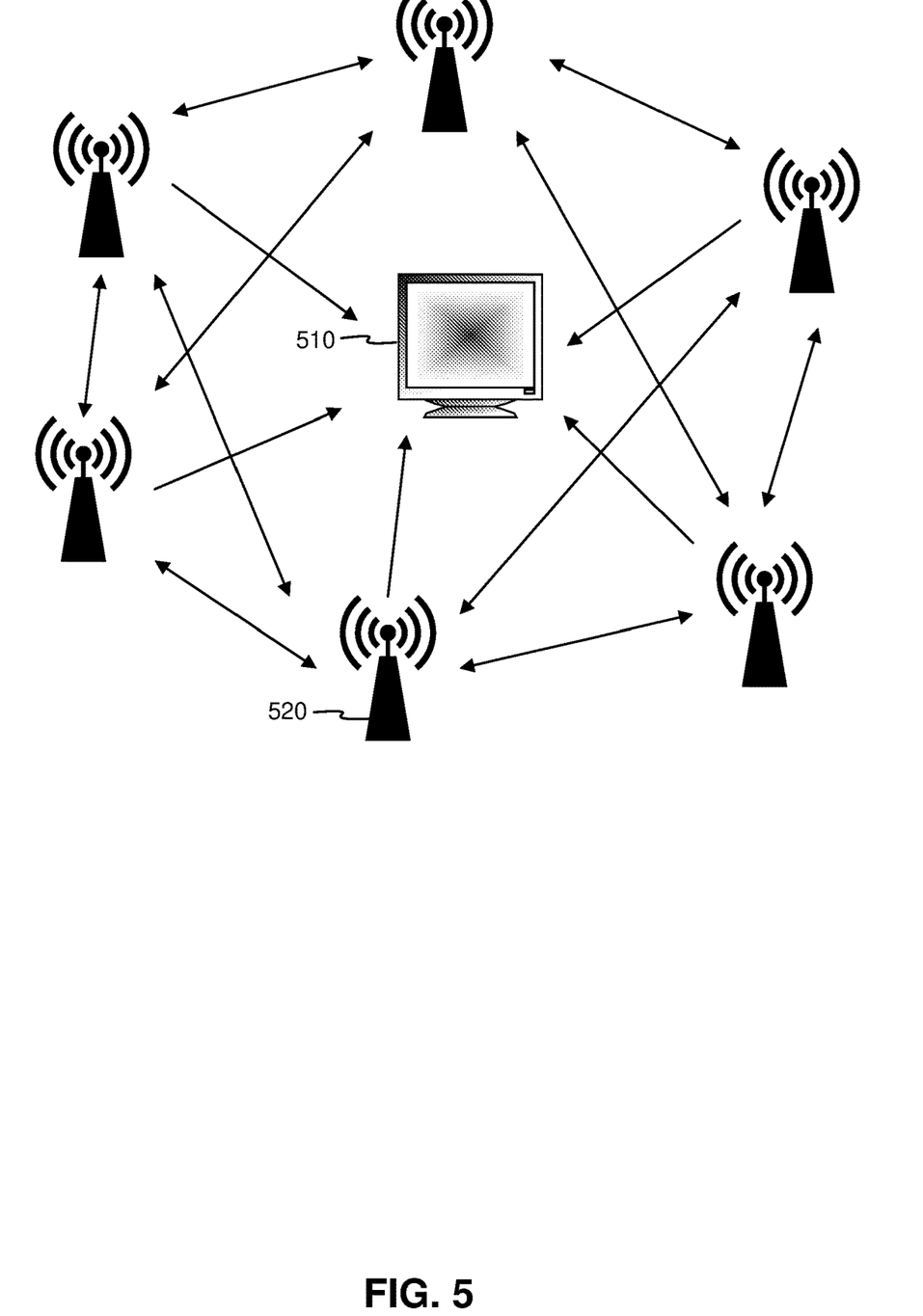
FIG. 5 illustrates sensor communication with a central computing environment.

FIG. 5 illustrates sensors 520 (sensors including accelerometers, snow detection sensors, stress/strain sensors, on site security cameras, irradiance sensors, soiling measurement sensors, humidity sensors, temperature sensors and any other sensor that observes on site environmental conditions or improves PV panel function) communicating with a central computing system 510. Each sensor 520 is enabled to transmit a signal, either through a wired or a wireless connection. The signal transmitted consists of the accelerometer data and data obtained from any other sensing devices that is included within the sensor apparatus 520. The central computing system 510 is located on or off site so that the central computing system 510 can receive data transmissions from the sensors 520 at all times. A sensor 520 may not include an accelerometer. Sensors 520 that do not include an accelerometer have the ability to communicate with the central computing system 510 whether through wired or wireless transmission.

Using a central computing system 510, conclusions about environmental conditions can be drawn from the collected sensor 520 data. The data is correlated across multiple accelerometer sensors 125. Multiple accelerometer sensors 125 show which direction the wind is moving by showing which accelerometer sensor 125 records movement during a specific time period. The peal magnitude and the time-stamp measured by the accelerometers can indicate the direction the wind is blowing and the magnitude of the gusts after that data is correlated across a collection of accelerometer sensors 125. First, a sufficient amount of data from the accelerometers must be collected, in particular recording peak magnitude of each accelerometer and the time-stamp. Second, that data must be correlated with wind activity. Third, the accelerometer data must be correlated with the PV panels reaction to the wind events.

Figure 6:
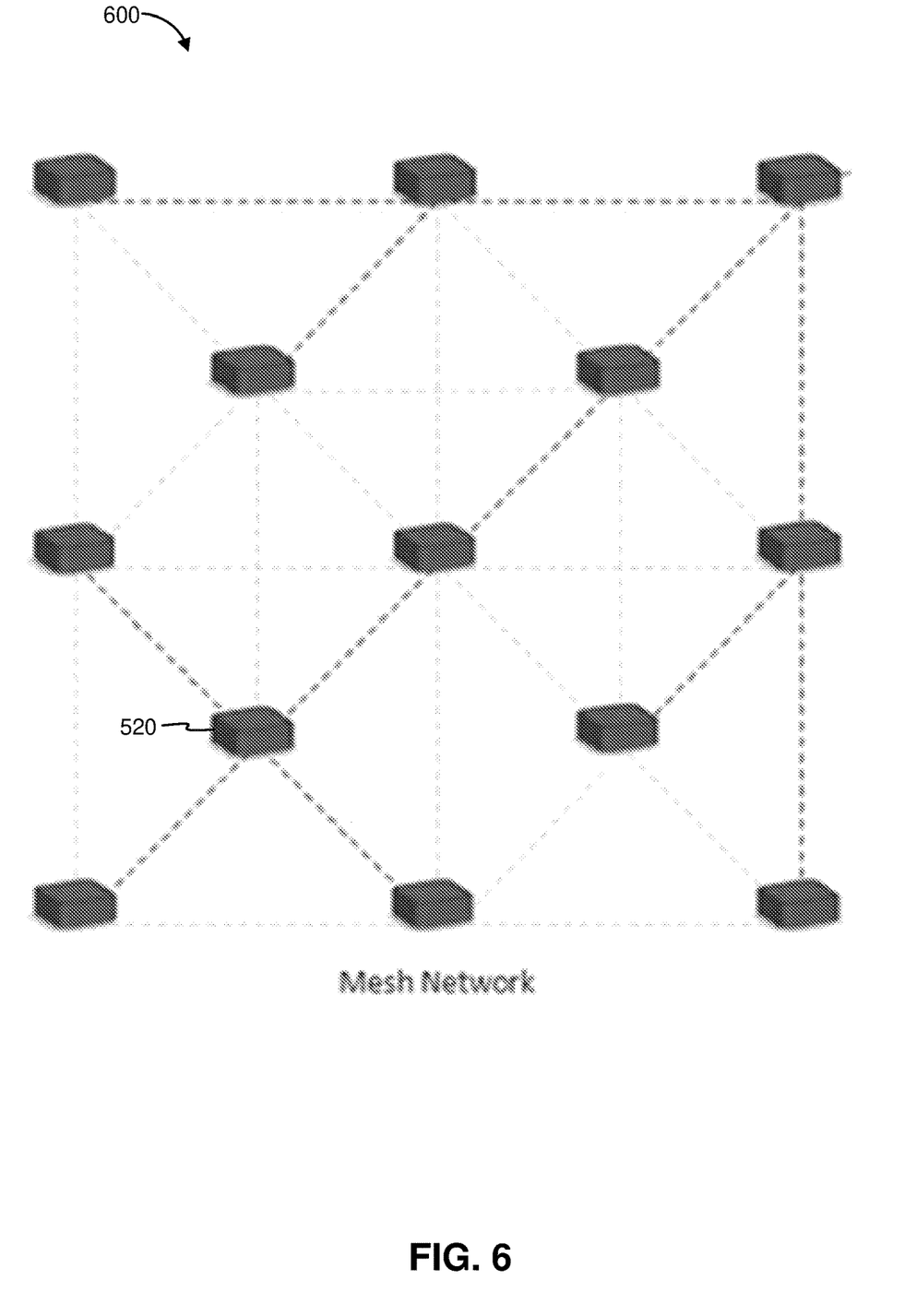
FIG. 6 illustrates a mesh network providing communication signals between sensors.

FIG. 6 illustrates a mesh network 600 established by the sensors 520. According to one embodiment, each sensor 520 has a wi-fi repeater device. The sensors 520 are laid out in a mesh to improve data collection. According to one embodiment, the mesh network 600 is a distributed network with no central node. Each node connects to neighboring nodes. The nodes are mutually responsible for transferring the data of the other nodes. The nodes operate as network access points within the mesh network.

Figure 7:
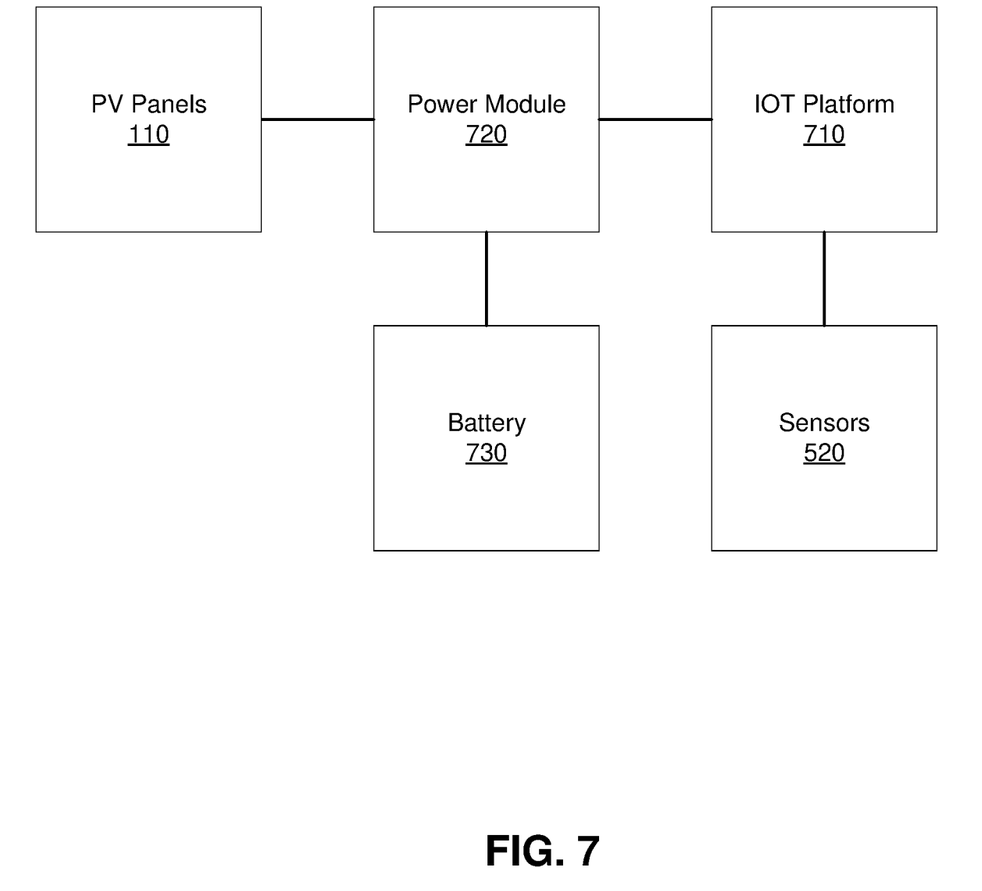
FIG. 7 illustrates a relationship between PV panels and sensors.

FIG. 7 illustrates a relationship between the sensors 520 and the PV panels 110. The sensors 520 communicate with an IOT Platform 710, according to one embodiment. The IOT Platform 710 determines what actions the PV panels 110 should take and then communicates that information to the PV panels 110 through the Power Module 720. The Power Module 720 is powered by a battery 730. The IOT platform provides sensor data acquisition, data analytics and a wireless network.

Data collected by the accelerometers and other sensors can be used to predict when the PV panels should be stowed. An artificial intelligence computer model can model PV panel behavior under different wind loads and then predict at which wind loads the PV panels should be stowed to avoid damage and when the PV panels should be left in the operating state despite environmental conditions to continue to collect solar energy. The PV system can either be in a full operating state where energy yield is maximized or a reduced operating state where there is a balance between wind load mitigation and energy production. Similarly, the data analyzed can be used to predict the cause of a failure after it has occurred. The data may indicate that the failure occurred because the installation was malfunctioning prior to the wind event or because at a certain peak wind load from a certain direction, the PV system failed.

Figure 8:
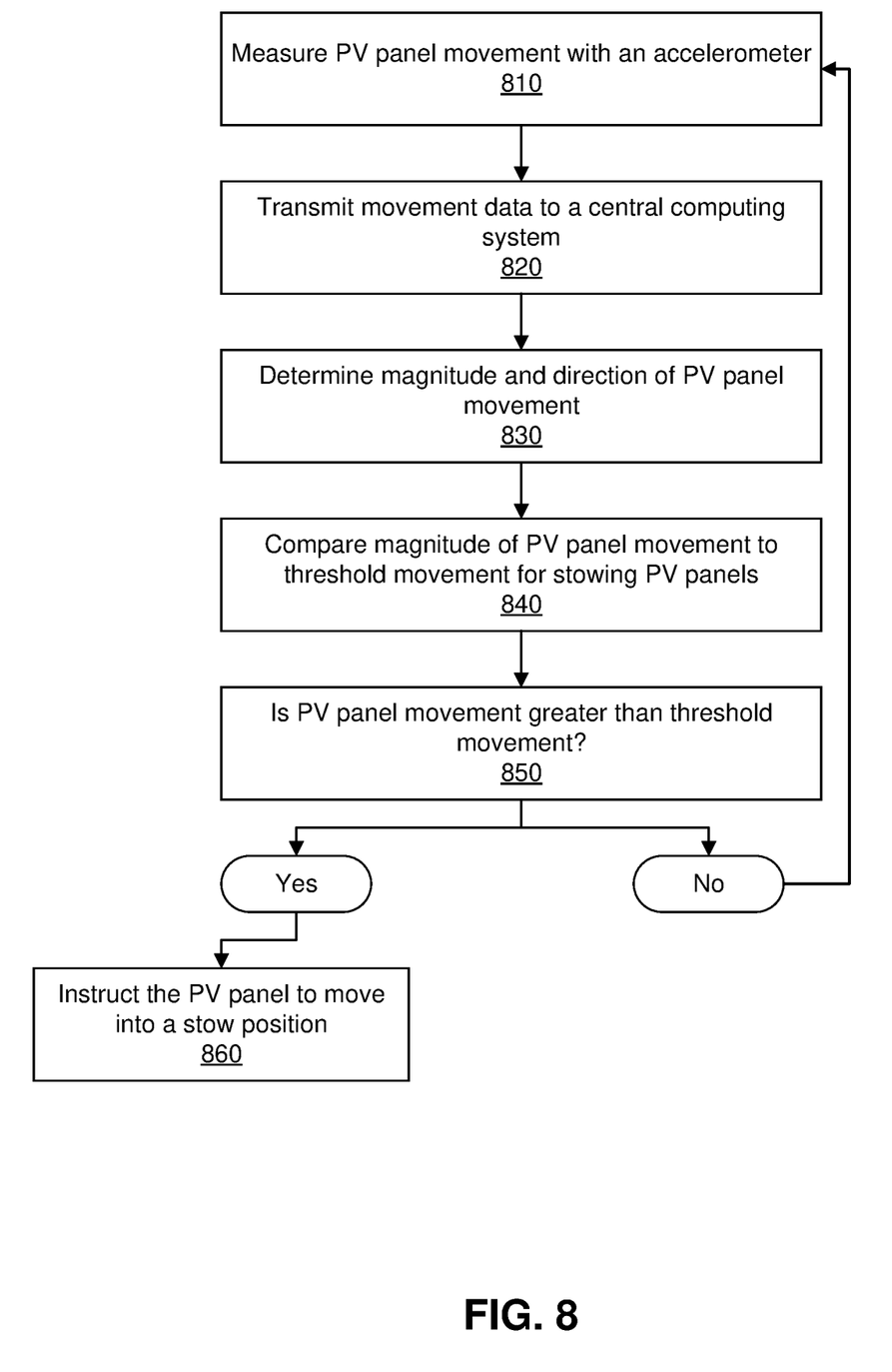
FIG. 8 is a flowchart illustrating a method for determining when to stow PV panels.

FIG. 8 is a flowchart illustrating a method for determining when to stow PV panels. At step 810, PV panel movement is measured with an accelerometer. At step 820, movement data is transmitted to a central computing system. At step 830, the magnitude and direction of PV panel movement is determined. At step 840, a computing system compares the magnitude of PV panel movement to a threshold movement for stowing PV panels. At step 850, the computing system determines if the PV panel movement is greater than the threshold movement. If the PV panel movement is not greater than the threshold movement then the process repeats when new movement data is received. At step 860, if the PV panel movement is greater than the threshold movement then the computing system instructs the PV panel to move into a stow position.

Figure 9:
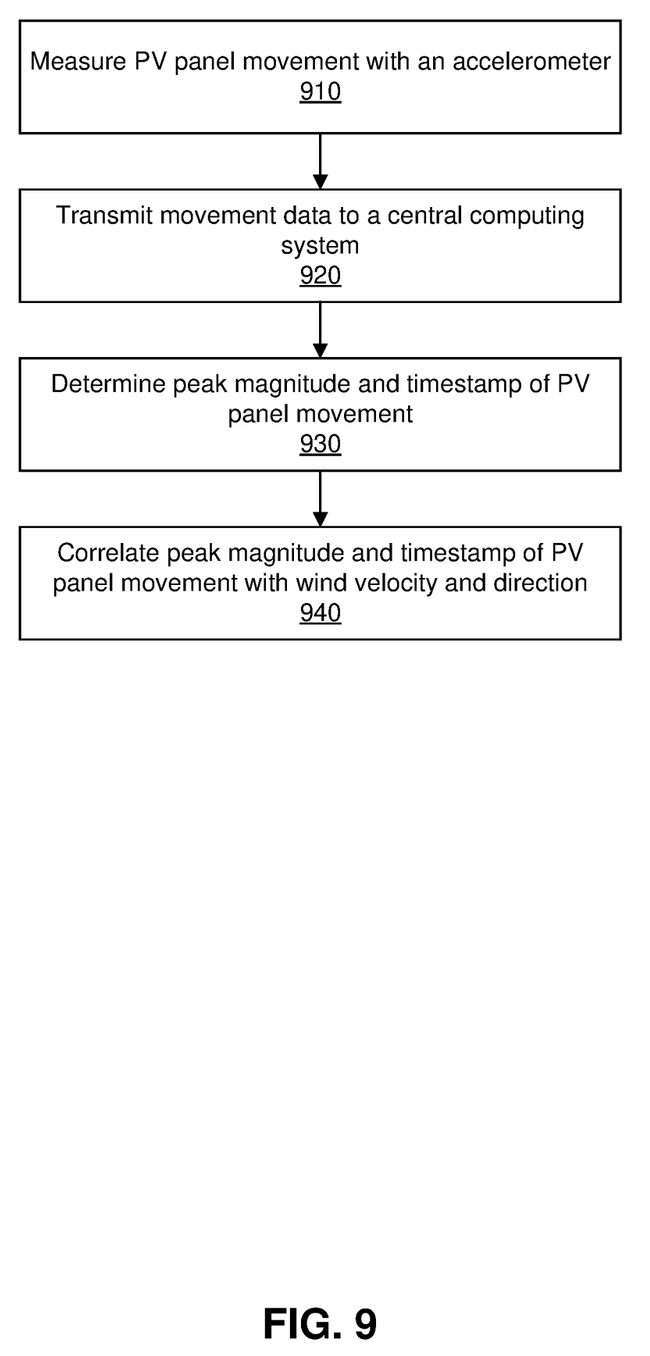
FIG. 9 is a flowchart illustrating a method for determining peak wind velocity and timestamp using an accelerometer.

FIG. 9 is a flowchart illustrating a method for determining wind velocity and direction using an accelerometer. At step 910, PV panel movement is measured by an accelerometer. At step 920, the accelerometer sensor device transmits the movement data to a central computing system. At step 930, the central computing system determines the peak magnitude and timestamp of PV panel movement. At step 940, the central computing system correlates peak magnitude and timestamp of PV panel movement with wind velocity and direction.

According to one embodiment, PV power plant sites will have anemometers in addition to an array of accelerometers. The combination of sensors increases the ability to correlate wind data with accelerometer movement. According to another embodiment, a wind map of the entire site for a time interval is created from the data collected from the array of accelerometers. This wind map provides data to correlate failures with the accelerometer data and time of failure.

Data collected by the accelerometers and other sensors can also be used to predict what the optimal placement for the sensors might be. Using previously collected accelerometer data and wind speed data, conditions for optimal placement of sensors are developed. Such as, it is best to place accelerometers on the east and west edges of the PV power plant project or at the top of a ridge.

According to one embodiment, collected data is stored on a blockchain. As data is collected from the accelerometers and other sensors the data is stored on a blockchain on a local device. The blockchain being immutable and verifiable. Storing sensor data on a blockchain provides the ability to look at the data and compare it to what was happening at the site during the time of the failure event. By logging the data locally on the site, the data is less likely to be lost in severe wind events.

Figure 10:
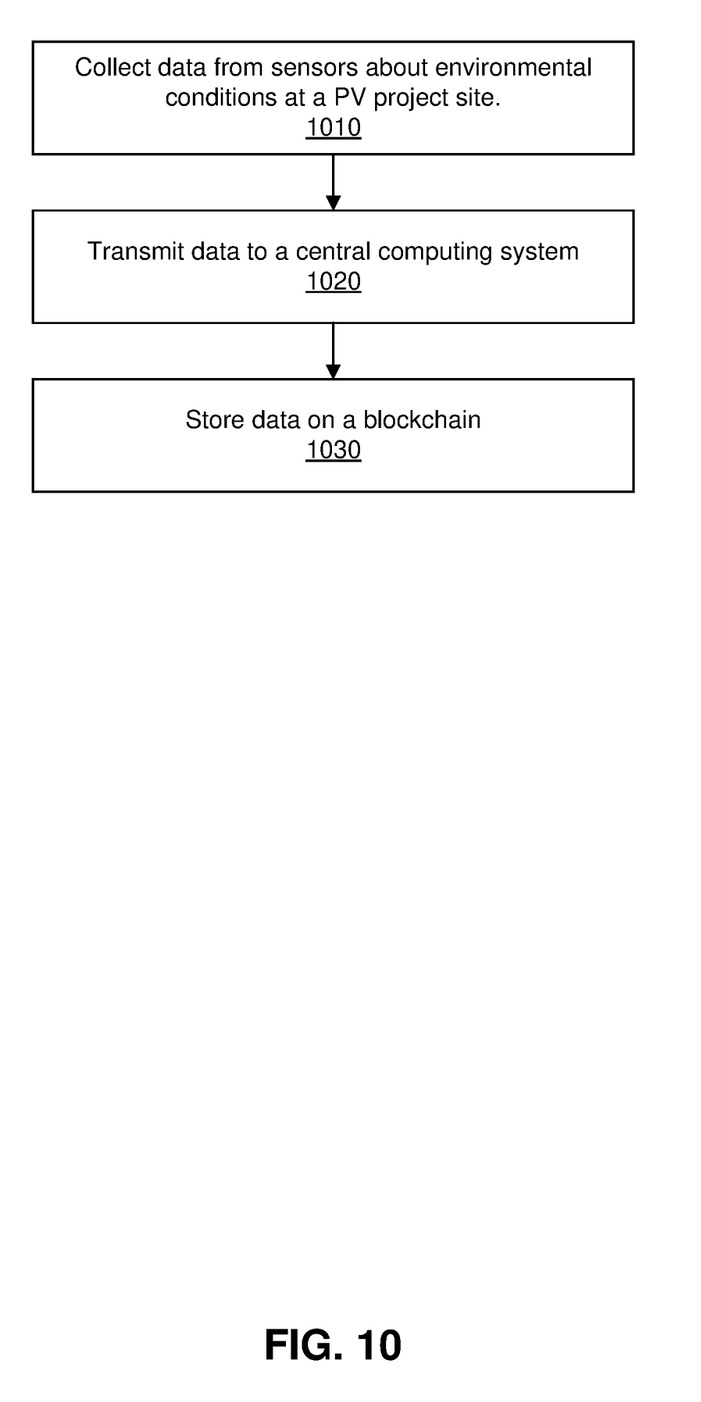
FIG. 10 is a flowchart illustrating a method for storing sensor data on a blockchain.

FIG. 10 is a flowchart illustrating a method for storing sensor data on a blockchain. At step 1010, data is collected from sensors about the environmental conditions at a PV project site. At step 1020, the collected data is transmitted to a central computing system. At step 1030, the collected data is stored on a blockchain.

Data collected by the sensors can be used to predict when maintenance services are needed for the PV system. The collected data may indicate that a given section of the array needs maintenance. The collected data may also indicate that a large wind event has significantly damaged a section of an array and that it is out of alignment or needs other maintenance.

Figure 11:
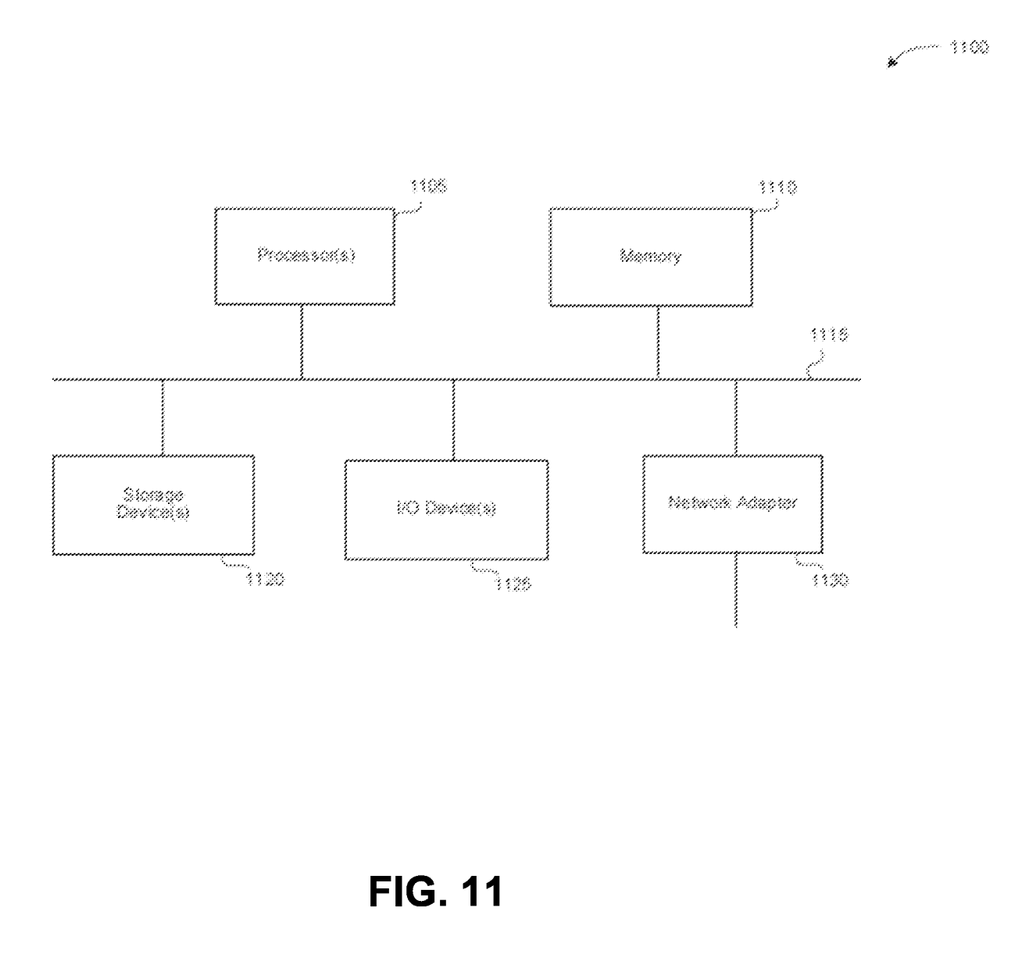
FIG. 11 illustrates an exemplary computing environment.

FIG. 11 is a block diagram of a computer system as may be used to implement features of the disclosed embodiments. The computer system 1100 may be used to implement any of the entities, components or services depicted in the examples of the foregoing figures (and any other components described in this specification). The computer system 1100 may include one or more central processing units ("processors") 1105, memory 1110, input/output devices 1125 (e.g., keyboard and pointing devices, display devices), storage devices 1120 (e.g., disk drives), and network adapters 1130 (e.g., network interfaces) that are connected to an interconnect 1115. The interconnect 1115 is illustrated as an abstraction that represents any one or more separate physical buses, point to point connections, or both connected by appropriate bridges, adapters, or controllers. The interconnect 1115, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 1110 and storage devices 1120 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 1110 can be implemented as software and/or firmware to program the processor(s) 1105 to carry out actions described above. In some embodiments, such software or firmware may be initially provided to the computer system 1100 by downloading it from a remote system through the computer system 1100 (e.g., via network adapter 1130).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

From the foregoing, it will be appreciated that specific embodiments of the invention have been described herein for purposes of illustration, but that various modifications may be made without deviating from the scope of the invention. Accordingly, the invention is not limited except as by the appended claims.

We claim:

1. An apparatus comprising:
   a sensor mounted directly to a photovoltaic (PV) panel of a single-axis solar tracker PV array, the sensor measures movement vector data of the PV panel about a single-axis solar tracker path;
   a data transmission device communicatively coupled to the sensor, the data transmission device transmitting the movement vector data as measured by the sensor;
   a power supply, the power supply configured to power the sensor and the data transmission device; and
   a central computing system that receives the movement vector data and generates a site-wide wind map across each single-axis tracker PV array within a given site by correlating peak magnitudes and timestamps of the movement vector data with wind speed and direction.

2. The apparatus of claim 1, further comprising:
   a battery, wherein the battery is charged by the power supply, and wherein the battery is configured to power the sensor and the data transmission device.

3. The apparatus of claim 1, wherein the movement vector data is time stamped.

4. The apparatus of claim 1, wherein the sensor is configured to attach to an outside edge of the PV panel.

5. The apparatus of claim 1, wherein the power supply is an independent PV panel.

6. The apparatus of claim 1, further comprising:
   a wi-fi repeater that supports a mesh network of data transmission devices communicatively coupled with sensors.

7. The apparatus of claim 6, wherein the wi-fi repeater comprises one part of the mesh network of additional wi-fi repeaters.

8. The apparatus of claim 1, wherein the central computing system stores the movement vector data on a blockchain.

9. The apparatus of claim 1, further comprising:
   an additional sensor, the additional sensor comprising any of:
   a snow detection sensor;
   a stress/strain sensor;
   a camera;
   an irradiance sensor;
   a soiling measurement sensor;
   a humidity sensor; or
   a temperature sensor.

10. A method for measuring photovoltaic panel movement within a single-axis solar tracker system, the method comprising:
    collecting, using a sensor mounted to a photovoltaic panel, data indicative of an acceleration vector associated with a photovoltaic panel on a single-axis solar tracker path;
    transmitting, using a wireless communication device communicatively connected to the sensor, the data to a central computing system;
    determining, using the central computing system, a magnitude and a direction of photovoltaic panel movement;
    identifying, by the central computing system, peak magnitudes and timestamps thereof across a tracker photovoltaic panel array farm including the photovoltaic panel based on the magnitude and the direction of photovoltaic panel movement; and
    generating, by the central computing system, a site-wide wind map across the tracker photovoltaic panel array farm including the photovoltaic panel via correlation of the peak magnitudes and the timestamps thereof of the photovoltaic panel movement with wind speed and direction.

11. The method of claim 10, further comprising:
    storing the data on a blockchain.

12. The method of claim 10, wherein the sensor is configured to be mounted on an edge of the photovoltaic panel.

13. The method of claim 10, wherein the wireless communication device comprises a wi-fi repeater that supports a mesh network of data transmission devices communicatively coupled with accelerometers.

14. The method of claim 13, wherein the wi-fi repeater comprises one part of the mesh network of additional wi-fi repeaters.

* * * * *